(12) United States Patent
Shevchenko et al.

(10) Patent No.: US 10,192,299 B2
(45) Date of Patent: Jan. 29, 2019

(54) METHOD OF AND SYSTEM FOR VERIFYING AUTHENTICITY OF PACKAGED ITEMS

(71) Applicant: Zortag, Inc., Great Neck, NY (US)

(72) Inventors: Alexander Shevchenko, Lake Grove, NY (US); Michael Gouzman, Centereach, NY (US); Dmitri Gavrilov, Setauket, NY (US); Satya P. Sharma, East Setauket, NY (US)

(73) Assignee: Zortag, Inc., Great Neck, NY (US)

( * ) Notice: Subject to any disclaimer, the term of this patent is extended or adjusted under 35 U.S.C. 154(b) by 137 days.

(21) Appl. No.: 14/883,735

(22) Filed: Oct. 15, 2015

(65) Prior Publication Data

US 2017/0109875 A1    Apr. 20, 2017

(51) Int. Cl.
*G06K 9/18* (2006.01)
*G06T 7/00* (2017.01)
*G06T 7/70* (2017.01)

(52) U.S. Cl.
CPC .............. *G06T 7/0004* (2013.01); *G06K 9/18* (2013.01); *G06T 7/70* (2017.01); *G06T 2207/30204* (2013.01)

(58) Field of Classification Search
USPC ....................................................... 235/454
See application file for complete search history.

(56) References Cited

U.S. PATENT DOCUMENTS

| 6,442,276 B1* | 8/2002 | Doljack ................. G06K 17/00 380/51 |
| 8,113,427 B2* | 2/2012 | Ross .................. G01N 21/3581 235/378 |
| 8,348,146 B1 | 1/2013 | Aurich |
| 8,955,754 B2* | 2/2015 | Atkinson et al. ............. 235/435 |
| 9,082,062 B2 | 7/2015 | Sharma |
| 2006/0100964 A1 | 5/2006 | Wilde |
| 2006/0165260 A1 | 7/2006 | Vanjani |

FOREIGN PATENT DOCUMENTS

EP    1577858    9/2005

* cited by examiner

*Primary Examiner* — Rafferty Kelly
(74) *Attorney, Agent, or Firm* — Kirschstein, Israel, Schiffmiller & Pieroni, P.C.

(57) ABSTRACT

During manufacture and packaging of items whose authenticity is to be verified, the items are marked with individual item characteristics, and placed in a package. A first item authentication code is determined from the individual item characteristics of the marked items. A first package authentication code is generated, and the package is marked with the first package authentication code. During item authentication in the field, an image of the package and the marked items is captured, a second package authentication code and the individual item characteristics are extracted from the captured image, the extracted individual item characteristics are processed to generate a second item authentication code, and the authenticity of the marked items is verified by matching the first and second package authentication codes and by matching the first and second item authentication codes.

18 Claims, 5 Drawing Sheets

METHOD OF AND SYSTEM FOR VERIFYING AUTHENTICITY OF PACKAGED ITEMS

BACKGROUND OF THE INVENTION

The present disclosure relates generally to a method of, and a system for, verifying the authenticity of items, especially of packaged items.

The counterfeiting of manufactured items poses a substantial risk to the development of many areas of trade. Counterfeit items not only reduce profit for legitimate manufacturers, but also can risk direct physical harm to consumers of counterfeit items, especially pharmaceutical drugs. A variety of technologies has been proposed to enable the detection of counterfeit items.

For example, it is known from U.S. Pat. No. 6,442,276 to mark manufactured items with unique codes that are stored in a database. The authenticity of each marked item is confirmed by reading the code on the item, and by performing a search of the database. In the protection scheme described in U.S. Pat. Pub. No. 2006/0100964, each item is assigned a unique identification sequence, which is converted to a coded check sequence using a secret key. The coded check sequence is applied to each manufactured item. The verification of authenticity is performed by reading and sending the coded check sequence to a server for processing. In U.S. Pat. No. 8,348,146, three unique codes are applied to each protected item. Authenticity is verified by sending one of the codes to a processing server, which recovers the remaining codes associated with each item from a database, and returns the recovered codes to a user for comparison.

In U.S. Pat. Pub. No. 2006/0165260, each item is supplied with a verification card that contains a unique identifier. The unique identifier on the card is used to verify item authenticity by contacting a verification center. Each identifier is used for verification only once, so that counterfeited items using duplicates of the original identifier may not be successfully authenticated. In Europe Pat. No. 1,577,858, each item is marked by a unique code, and authenticity verification is performed by database lookup at a remote server. The codes on the items are initially covered by a protective layer and are hidden from users. In order to verify authenticity, a user removes the protective layer, reads and sends the code to the remote server. Once the code is used, it is deactivated in the database, and further requests with the same code will return a negative result. The protective layer covering the code ensures that the code on the item is unused and active in the database.

Although the known techniques for detecting counterfeit items are generally satisfactory for their intended purpose, counterfeiting is still rampant, and improvements in counterfeit detection, especially of items contained in a package, are still needed.

Accordingly, it would be desirable to enhance the verifying of the authenticity of packaged items.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
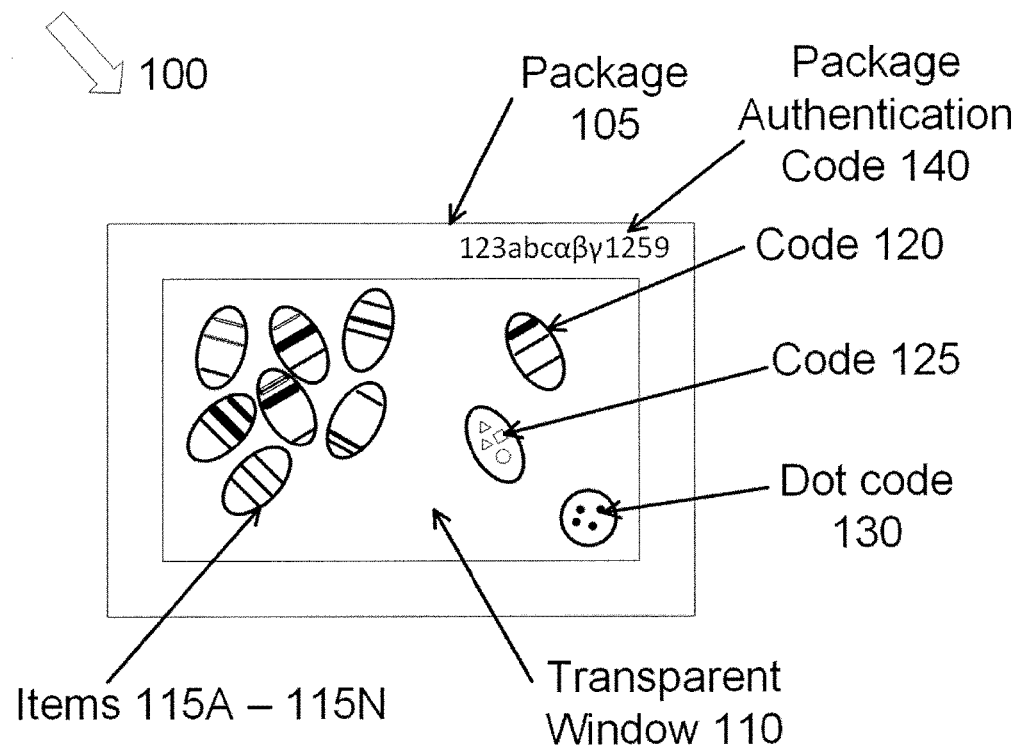
FIG. 1 is a front view of a package containing multiple marked items that are visible through a window on the package.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One feature of this disclosure relates to a method of verifying the authenticity of items. The method steps are performed, during manufacture and packaging of the items, by marking the items with individual item characteristics, by placing the marked items in a package, by determining a first item authentication code from the individual item characteristics of the marked items, by generating a first package authentication code, and by associating the package with the first package authentication code. Thereupon, during authentication in the field, the method steps are further performed by capturing an image of the marked items, by extracting individual item characteristics from the captured image, by processing the extracted individual item characteristics to generate a second item authentication code, by acquiring a second package authentication code, and by verifying authenticity of the marked items by matching the first and second package authentication codes and by matching the first and second item authentication codes. Preferably, the capturing step is performed by also capturing the package in the image, and the acquiring step is performed by extracting the second package authentication code from the captured image.

Another feature of this disclosure relates to a system for verifying the authenticity of items. The system includes individual item characteristics marked on the items, a package in which the marked items are placed, a first image capture device for acquiring a first image of the marked items to determine a first item authentication code from the individual item characteristics of the marked items, and a first package authentication code associated with the package. The system further includes a second image capture device for capturing a second image of the marked items, a reader for acquiring a second package authentication code, and a controller for extracting individual item characteristics from the captured second image, for processing the extracted individual item characteristics to generate a second item authentication code, and for verifying authenticity of the marked items by matching the first and second package authentication codes and by matching the first and second item authentication codes. Preferably, the second image capture device is operative for also capturing the package in the second image, in which case, the controller also extracts the second package authentication code from the captured second image.

In accordance with one aspect of this disclosure, each item in the package is marked with its own individual characteristic, and additional characteristics, such as the shape, size, color, position, orientation, material nature, or another identifying feature, either taken alone or in combination, of each item, may also be used to uniquely identify and mark each item. An image of the individual item characteristics of the marked items is then advantageously acquired by the first image capture device and processed to determine a first item authentication code from the individual item characteristics. A first package authentication code is associated with the package and is either generated randomly, or from the first item authentication code. The first package authentication code is advantageously marked, and directly placed, on the package in a human-readable form, such as alphanumeric text, or may be associated with the package in a machine-readable form, such as a bar code symbol printed on the package, or as a radio frequency identification (RFID) tag attached to the package. The first item authentication code and the first package authentication code are advantageously stored in a database.

The second image capture device is preferably a camera built into a portable, handheld device, such as a smartphone. One or more images of the package and the items are captured by the smartphone, and processed in order to extract the second package authentication code and the individual item characteristics. The second item authentication code is generated from the extracted individual item characteristics. Authenticity is verified by checking whether a match exists between the first and second item authentication codes as well as between the first and second package authentication codes. Authentication can be performed locally by the handheld device, or remotely by a remote server. The server performs authentication by performing a database search, and by comparing the first and second item authentication codes and the first and second package authentication codes. Additional protection may be achieved by storing information on the sets of item and package authentication codes in the database, and by counting the number of authentication checks that have been requested for each set. If an excessive number of requests are detected, then a possible counterfeit item is reported.

Figure 2:
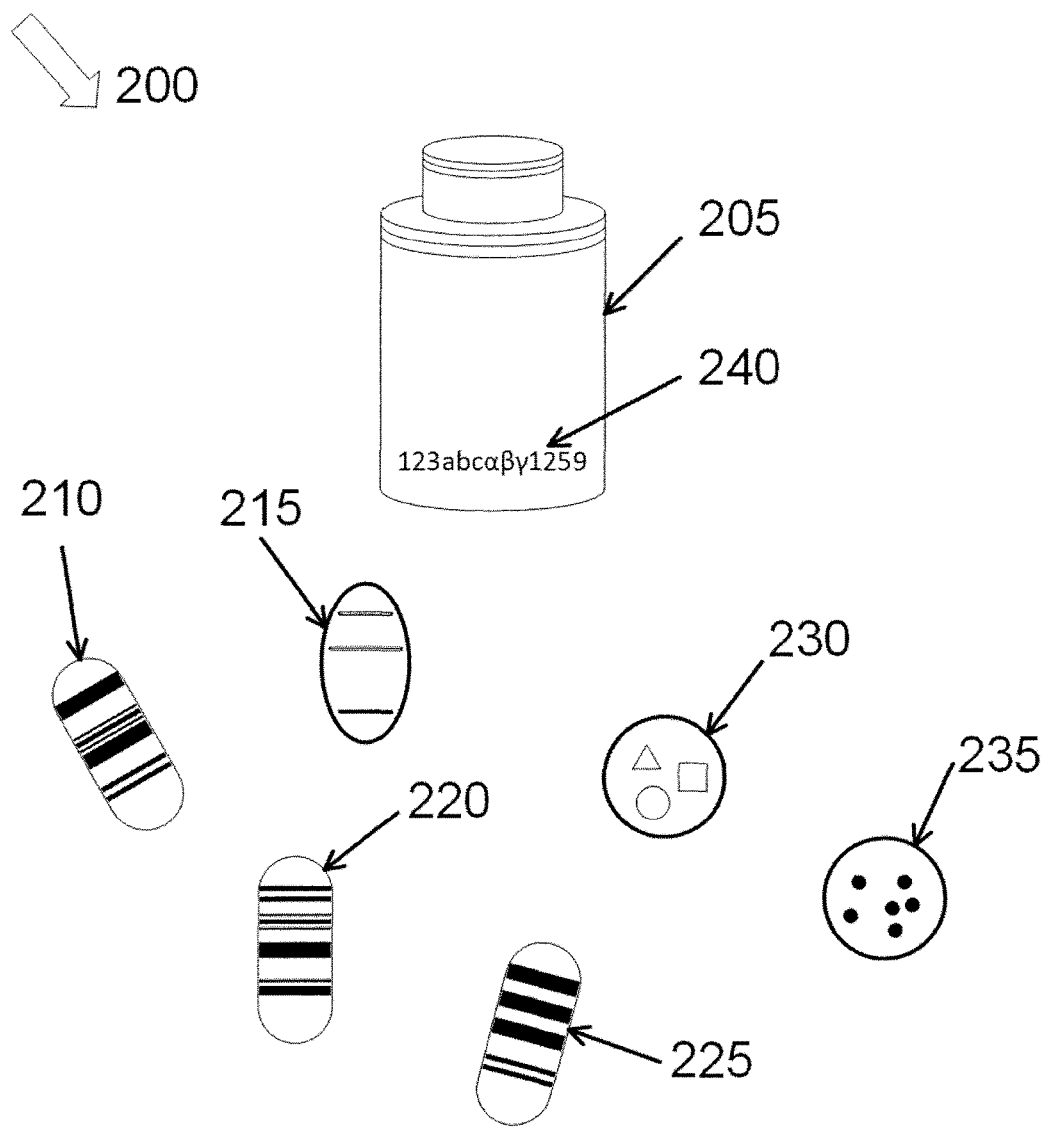
FIG. 2 is a perspective view of a different package containing multiple marked items that are shown removed from the package.

Turning now to the drawings, reference numeral 100 in FIG. 1 generally identifies a packaged item set including a package 105 having a transparent window 110, and a plurality of items 115A to 115N, where N can be any whole number, placed within the package 105 and exteriorly visible through the window 110. Although the package 105 is shown as a generally rectangular envelope having a generally rectangular window, it will be understood that packages and windows of many different types, shapes and sizes, with and without windows, could be employed. Indeed, as described below, the package 205 of FIG. 2 is a generally cylindrical container that has no window. Although the items 115A to 115N are shown as pharmaceutical drugs, it will be understood that a myriad of other items, not necessarily drugs, of various types, shapes and sizes, could be placed in the package 105. For example, the items 115A to 115N are shown as ovoidal capsules, but could be cylindrical capsules, circular pills, tablets, caplets, caps, gelcaps, lozenges, pellets, or the like.

The items 115A to 115N are marked or associated with identifying markings, features, or characteristics. For example, the items 115A to 115N may be marked with different codes, colors, sizes, shapes, or fluorescent materials. For example, one type of code is a barcode 120 having spaced-apart, thick and thin bars printed on and around the outer surface of each item such way that the codes remain visible through the window 110 even if the items are shifted or rotated inside the package 105. Instead of barcodes 120, other codes, such as a geometrical code 125 comprising a combination of geometrical shapes such as triangles, circles, trapezoids, etc., may be used. As another example, a dot code 130 comprising a plurality of spaced-apart dots may be used. As previously mentioned, the items 115A to 115N can be of different colors; for example, item 115A can be a green color, item 115B can be a red color, and so forth. In addition, the codes can also be of different colors.

The items can be randomly packaged in the package 105 such that all the items have different identifying markings or characteristics. Small batches of the items can be manufactured so that the items in each batch are marked with identical markings, and then the items from multiple batches are thoroughly mixed, to ensure that items with different markings, codes, shapes, sizes, or colors are selected for packaging. It is also possible that all the items in the package 105 have the same identifying markings or characteristics.

Reference numeral 200 in FIG. 2 identifies a different packaged item set where the cylindrical container or package 205 is opaque and has no transparent window through which the items are visible. As shown, the items 210, 215, 220, 225, 230 and 235 have been removed from the package 205 and spread out over a support surface. The items 210, 220 and 225 are cylindrical capsules having different barcodes printed thereon; the item 215 is an ovoidal capsule having a different barcode thereon; and the items 230 and 235 are circular pills having a geometrical code and a dot code, respectively. In addition, the items 210, 215, 220, 225, 230, and 235 can also be differently colored, and the codes themselves may be differently colored. It is desirable in both the embodiments of FIGS. 1 and 2 to have as much randomness as possible by mixing the shape, the size, the code, and the color of the items, as well as the shape, the size, the color, and the code type, of the codes on the items.

Figure 3:
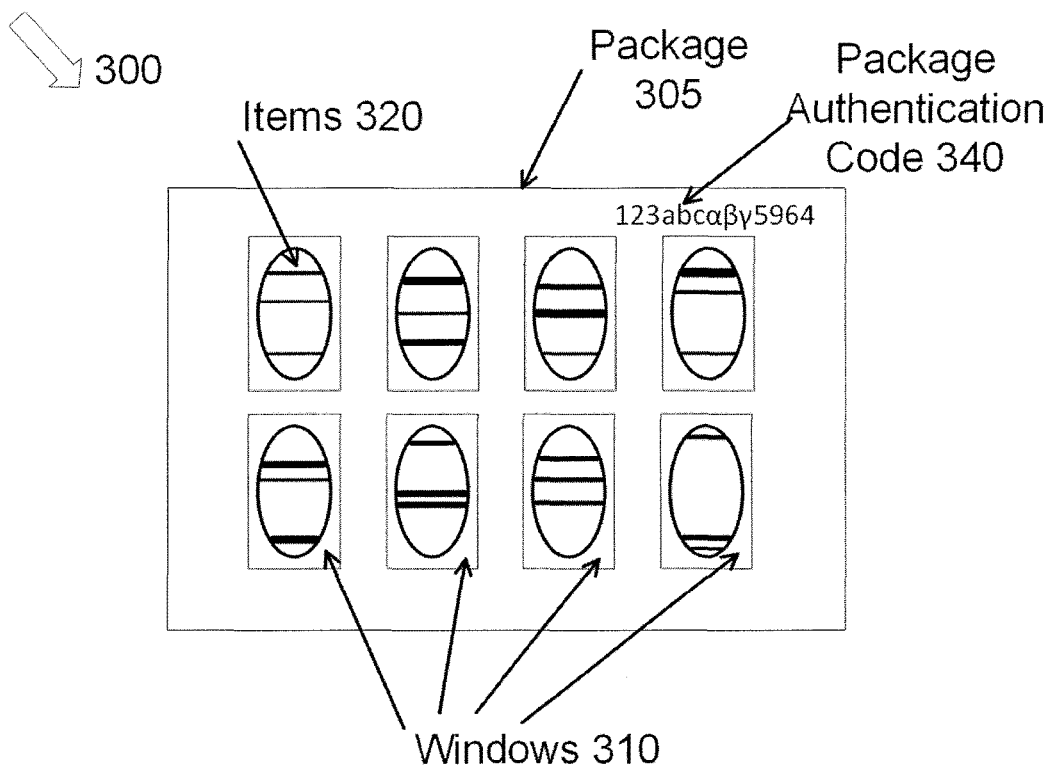
FIG. 3 is a front view of a package containing multiple marked items that are fixed in predetermined positions and that are visible through individual windows on the package.

Reference numeral 300 in FIG. 3 identifies a different packaged item set where a package 305 has a plurality of transparent windows 310, and a plurality of items 320 is placed in fixed positions and orientations within the package 305, each item 320 being upright and exteriorly visible through a respective window 310. The fixed position and upright orientation of the items are additional features that identify the items.

Figure 4:
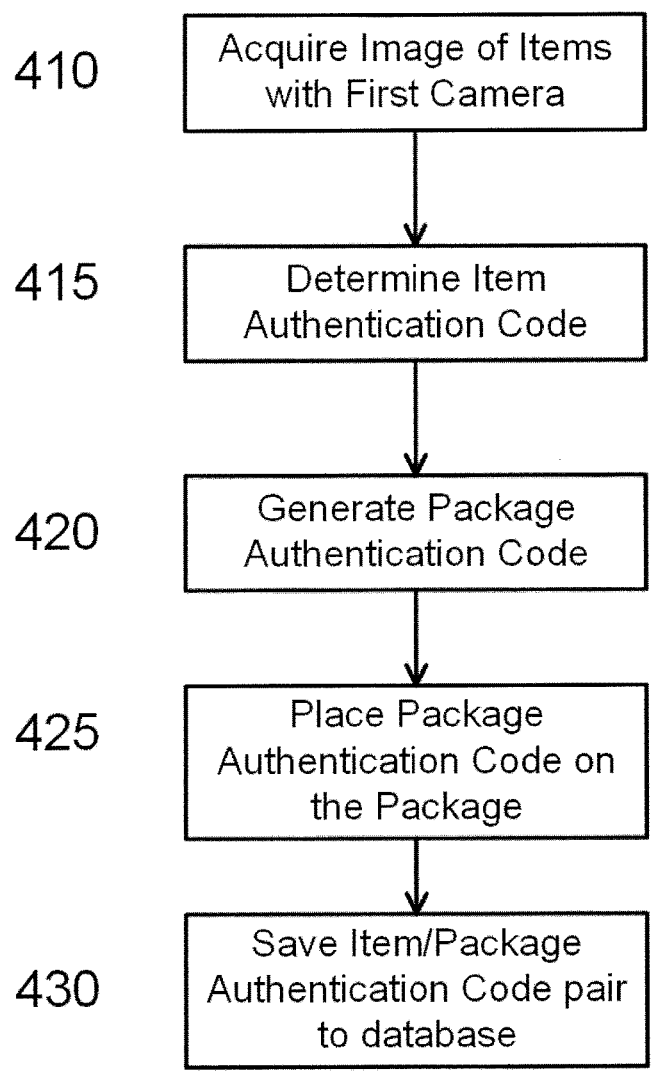
FIG. 4 is a flow chart setting forth steps performed in creating an item authentication code and a package authentication code during manufacture and packaging of the items.
Figure 5:
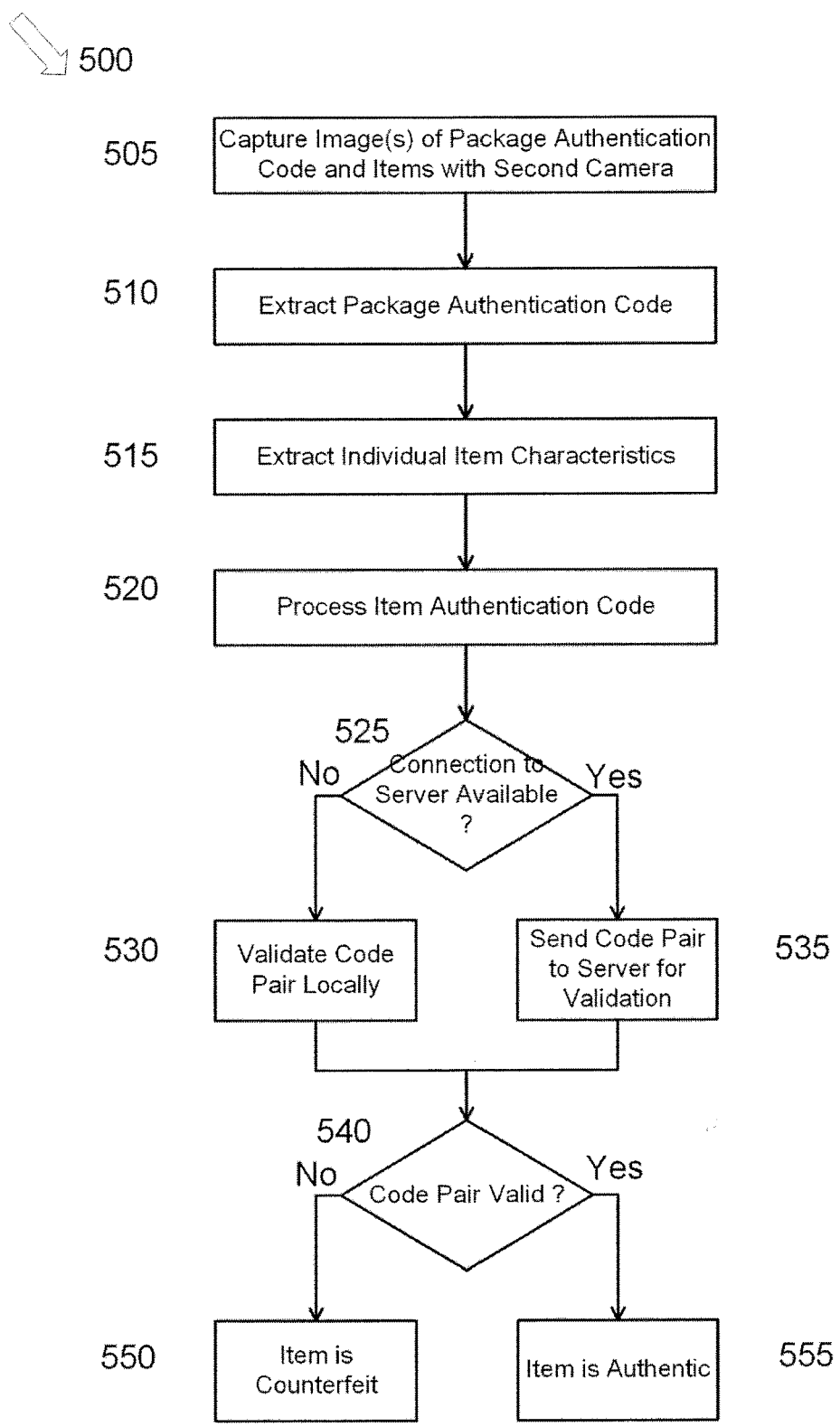
FIG. 5 is a flow chart setting forth steps performed in verifying the authenticity of an item in the field.

In accordance with this disclosure, the authenticity of the aforementioned items is verified by performing the steps depicted in the flow chart 400 of FIG. 4 during manufacture and packaging of the items, and by performing the steps depicted in the flow chart 500 of FIG. 5 during authentication in the field. As described above, the items of FIGS. 1-3 are initially marked with individual item characteristics, and are placed in any of the packages of FIGS. 1-3. In step 410, a first item authentication code is determined from the individual item characteristics of the marked items, by acquiring an image of the marked items with a first image capture device, preferably a first camera built into a portable, handheld device, such as a smartphone, or built into a stationary device, the first camera being operated by the manufacturer/packager. The acquired image of the marked items may be obtained when the items are inside the package (see FIGS. 1 and 3), or when the items are outside the package and spread over a support surface (see FIG. 2). In step 415, the acquired image is then processed to extract the individual item characteristics, and to determine the first item authentication code from the extracted individual item characteristics.

Next, a first package authentication code is generated in step 420. The first package authentication code may be generated randomly, or preferably, is generated by processing the first item authentication code. The first package authentication code is then associated with the package in step 425. The first package authentication code is advantageously marked, and directly placed, on the package in a human-readable form, such as alphanumeric text. The first package authentication code may be directly printed on the respective package, or may be printed on an adhesive label that is then adhered to the respective package. Thus, in FIG. 1, the first package authentication code 140 is marked on the package 105; in FIG. 2, the first package authentication code 240 is marked on the package 205; and in FIG. 3, the first package authentication code 340 is marked on the package 305. The first package authentication code may also be associated with the package in a machine-readable form, such as a bar code symbol printed on the package, or as a radio frequency identification (RFID) tag attached to the package, or as a dot code, etc. In step 430, the first item authentication code and the first package authentication code are stored in a database, as described below.

As shown in FIG. 5, authentication in the field may be performed, in step 505, by capturing an image of the package and the marked items, with a second image capture device, preferably a second camera built into a portable, handheld device, such as a smartphone, or built into a stationary device, the second camera being operated by the authenticator, typically a consumer who is purchasing the items and who has a smartphone readily available. The second image capture device may take a single image of the package and the marked items, or may take a plurality of images of the package and the marked items. In step 510, a second package authentication code is extracted from the captured image. In step 515, the individual item characteristics are extracted from the captured image. In step 520, the extracted individual item characteristics are processed to generate a second item authentication code. If the first package authentication code that was associated with the package was in a non-visual, non-optically-capturable form, such as by being embodied in an RFID tag, then the appropriate reader, such as an RFID reader, is used to acquire the second package authentication code. The RFID reader may either be built into the handheld device, or is a separate device.

In step 525, the authentication continues by determining if a wireless connection to a remote server is available. If such a connection is not available, then authentication is performed locally (step 530), as described below. The user may be given a choice between local or remote authentication, and may select to perform local authentication even if the wireless connection is available. If such a connection is available, then the second package authentication code and the second item authentication code are sent to the remote server in step 535. The remote server accesses the database in which the first package authentication code and the first item authentication code were previously stored (step 430), and authenticity of the marked items is verified by matching the first and second package authentication codes and by matching the first and second item authentication codes in step 540. If both pairs of codes match, then the item is authentic (step 555). If both pairs of codes do not match, then the item is counterfeit (step 550). In addition, a count may be made as to how many matches of both the first and second item authentication codes and the first and second package authentication codes have been made, and reporting a counterfeit item when the count of the same matches exceeds a predetermined number.

The first package authentication code can be generated from the first item authentication code using an encryption algorithm in step 420. Both symmetric and asymmetric encryption schemes are acceptable. If asymmetric encryption is used, then the local validation of the second item/package authentication code pair is possible locally inside the smartphone by using a public key. In this case, a private key is used to compute the first package authentication code from the first item authentication code, and a public key is used to compute the second package authentication code from the second item authentication code. Since the private key is used only in manufacturing, it is not held in the smartphone and is not revealed to users.

As previously described, the first package authentication code may be generated from the first item authentication code by using an encryption algorithm. If the selected encryption algorithm is such that the second item authentication code can be recovered from the second package authentication code, then verification of authenticity is possible by comparing the recovered item authentication code and the item authentication code determined from the individual item characteristics. Since this procedure does not require a database lookup, it can be performed locally in a handheld reader. The best choice of the encryption algorithm is a public key encryption. In this case, a private key may be used to generate the package authentication code, and a public key may be used to recover the item authentication code. The private key is kept secret and used during manufacturing, and the public key is distributed to customers (built into authentication software) and used for authenticity verification. The code pair may also be recorded in the database at the remotely accessible server, and a database search may be used for validation of the code pair. If requests are sent to the remote server, then the number of requests for each code pair may be computed and, if the number of requests for a particular code pair exceeds a certain threshold, then a possible counterfeit alert is issued.

In a variation, a part of the first package authentication code may be generated using an encryption algorithm, and another part of the first package authentication code may be generated randomly. In this case, local authentication (recovery of the item authentication code from the package authentication code and comparing with the item authentication code derived from the items' characteristics) is also possible. However, sending the code pair to the remote server for verification will improve the reliability of the authentication, because a longer code is checked. Also, the number of requests for the code pair can be used to detect an excessive number of requests to the same code.

The first package authentication code may also be a random three-dimensional structure, as described in U.S. Pat. No. 9,082,062. If such a three-dimensional code is used, then the item authentication code as derived from individual item characteristics is stored in the remote database. In this case, authentication of items can only be done by a remote database search.

If the package authentication code is generated randomly, and the item/package first authentication code pair is recorded in a database, then authentication of items can be performed only by a database search. Also, the number of requests for the code pair can be used to detect an excessive number of requests to the same code.

During authenticity verification in the field, the image or multiple images of the package and the items are taken by the camera of the portable reader operated by the user. The characteristics of the individual items and the second package identification code and the individual item characteristics are extracted from the image. The second item identification code is derived from the individual item characteristics. The item/package second authentication code pair is thus obtained. If a connection, preferably wireless, to the external server is available, then the item/package second authentication code pair is sent to the remote server and verified using a database search. If the connection is not available, then the original item authentication code is recovered from the package authentication code using a decryption algorithm (possibly using a public key) and the recovered item authentication code is compared with the item authentication code obtained from the items. If the codes match, then the item is considered authentic. If they do not match, then the items are reported as counterfeit. Local authentication is possible only if the package code is generated from the item authentication code, and the item authentication code could be recovered from the package authentication code. If the package authentication code is generated randomly, or is a random three-dimensional structure based as in U.S. Pat. No. 9,082,062, then only remote authentication by a database search is possible.

In a variation, the transparent window 110 may be initially covered with a removable, opaque protective film, which has to be subsequently removed to expose the items before authentication. When fluorescent markers or dyes are used, the second image capture device is also advantageously equipped with an additional light source and an optical filter.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of verifying authenticity of items, comprising:

during manufacture and packaging of the items, marking the items with individual item characteristics, placing the marked items in a package, determining a first item authentication code from the individual item characteristics of the marked items, generating a first package authentication code, and marking the package with the first package authentication code, the first item authentication code and the first package authentication code both being visible and stored in a database; and during authentication in the field, simultaneously capturing an optical image of both the first item authentication code and the first package authentication code, extracting both individual item characteristics of the marked items and a second package authentication code of the package from the captured image, processing the extracted individual item characteristics to generate a second item authentication code, and verifying authenticity of the marked items by matching the first and second package authentication codes and by also simultaneously matching the first and second item authentication codes.

2. The method according to claim 1, wherein the marking of the items is performed by associating an identifying mark with each item.

3. The method according to claim 1, wherein the marking of the items is performed by at least one of shaping, sizing, coloring, and using fluorescent materials on, the items.

4. The method according to claim 1, wherein the placing of the items is performed by holding the items in fixed positions inside the package, and wherein the marking of the items is performed by exposing the fixed position of each held item to view.

5. The method according to claim 1, wherein the generating the first package authentication code is performed by processing the first item authentication code.

6. The method according to claim 1, wherein the generating of the first package authentication code is performed by generating a random code.

7. The method according to claim 1, and counting how many matches of both the first and second item authentication codes and the first and second package authentication codes have been made, and reporting a counterfeit item when a count of the same matches exceeds a predetermined number.

8. The method according to claim 1, and storing the first item authentication code and the first package authentication code in a database.

9. The method according to claim 1, wherein the generating of the first package authentication code is performed by processing the first item authentication code with a private encryption key.

10. A system for verifying authenticity of items, comprising:

individual item characteristics marked on the items and determinative of a first item authentication code;

a package in which the marked items are placed;

a first package authentication code marked on the package, both the first item authentication code and the first package authentication code being visible and stored in a database;

an image capture device for simultaneously acquiring an optical image of both the first item authentication code;

a controller for extracting both individual item characteristics of the marked items and a second package authentication code of the package from the captured image, for processing the extracted individual item characteristics to generate a second item authentication code, and for verifying authenticity of the marked items by matching the first and second package authentication codes and by also simultaneously matching the first and second item authentication codes.

11. The system according to claim 10, wherein each marked item has an identifying mark associated therewith.

12. The system according to claim 10, wherein each marked item has at least one of a shape, a size, a color, and a fluorescent material thereon.

13. The system according to claim 10, wherein the package holds the items in fixed positions inside the package, and wherein the marked items are exposed to view.

14. The system according to claim 10, wherein the first package authentication code is processed from the extracted individual item characteristics.

15. The system according to claim 10, wherein the first package authentication code is a random code.

16. The system according to claim 10, and a database for storing the first item authentication code and the first package authentication code.

17. The system according to claim 10, wherein the controller counts how many matches of both the first and second item authentication codes and the first and second item package authentication codes have been made, and reports a counterfeit item when a count of the same matches exceeds a predetermined number.

18. The system according to claim 10, wherein the first package authentication code is processed from the first item authentication code with a private encryption key.

* * * * *